United States Patent
Wyner

[11] Patent Number: 5,413,808
[45] Date of Patent: May 9, 1995

[54] METHOD FOR LONG RANGE PRESERVATION TREATMENT BY LIQUID-AIR INJECTION OF INFRASTRUCTURE MONUMENTS AND OTHER POROUS AND EMBEDDED STEEL STRUCTURES

[75] Inventor: Jay S. Wyner, 69 Barkers Point Rd., Sands Point, N.Y. 11050

[73] Assignee: Jay S. Wyner, Sands Pt., N.Y.

[21] Appl. No.: 695,528

[22] Filed: May 3, 1991

Related U.S. Application Data

[63] Continuation-in-part of Ser. No. 375,681, Jul. 5, 1989, abandoned.

[51] Int. Cl.⁶ ............................................. B32B 35/00
[52] U.S. Cl. ..................................... 427/140; 15/320; 15/321; 15/322; 118/300; 239/290; 239/398; 239/418; 427/136; 427/393.6; 427/407.1; 427/409; 427/421
[58] Field of Search ............... 118/300; 427/421, 409, 427/393.6, 140, 407.1, 136; 239/290, 418, 398; 15/321, 320, 322

[56] References Cited

U.S. PATENT DOCUMENTS

| | | | |
|---|---|---|---|
| 1,953,452 | 4/1934 | Wertz | 427/140 X |
| 3,640,429 | 2/1972 | Campbell | 118/300 X |
| 4,153,735 | 5/1979 | Caramanian | 427/136 |
| 4,204,495 | 5/1980 | Wyner | 118/300 |
| 4,342,796 | 8/1982 | Brown et al. | 427/136 |
| 4,395,457 | 7/1983 | Wyner | 427/402 X |
| 4,448,818 | 5/1984 | Hortog et al. | 118/300 X |
| 4,520,051 | 5/1985 | Harrison | 427/140 X |
| 4,716,051 | 12/1987 | Rödder | 427/136 |

Primary Examiner—Bernard Pianalto
Attorney, Agent, or Firm—Nathaniel Altman

[57] ABSTRACT

A method for preserving porous structures, including masonry structures having embedded structural or reinforcing steel rods, applies liquid preservative material to an exposed surface of the structure and injects the material into the structure using the blasting force of a compressed air stream at high velocity. The apparatus for practicing the method includes separate manifolds having multiple outlet nozzles provided for the liquid material and for the air streams, both manifolds covered by a shroud. The manifolds and their nozzles are arranged so that, as the liquid is applied to the surface of the structure, the high velocity air forces or injects it into the interior of the structure, so as to coat the interstices of the inner porous structure including any reinforcing steel therein, the high velocity air streams acting as a fluid hammer. The preservation of the structures occurs without the need of disturbing, breaking open or repairing brick, concrete or masonry structures.

18 Claims, 2 Drawing Sheets

METHOD FOR LONG RANGE PRESERVATION TREATMENT BY LIQUID-AIR INJECTION OF INFRASTRUCTURE MONUMENTS AND OTHER POROUS AND EMBEDDED STEEL STRUCTURES

BACKGROUND OF INVENTION

This is a continuation-in-part application of Ser. No. 07/375,681, filed Jul. 5, 1989, abandoned.

This invention pertains to the long range preservation of porous structures, such as concrete, masonry, stone and wood, particularly concrete and masonry structures having reinforcing steel members embedded therein, by applying a suitable liquid preservative material therein utilizing high velocity air streams for forcing the liquid material to penetrate the porous structure.

The use of reinforcing steel members in concrete and other porous masonry structures, including buildings, roads, bridges, tunnels, monuments and even art structures, is well known. These porous structures, being exposed to environmental elements, tend to deteriorate due to many causes, which include acid rain, salts, extreme temperatures and various pollutants in the atmosphere. Also, in the art world, many monuments and sculptures may sometimes deteriorate and lose their identity. The previous preservation efforts for such man-made structures have had short-term (3-4 years) results, and in many instances have caused more harm than good.

Present Masonry Preservation: In order to understand why presently used methods of preservation have produced only short-term protection, one must understand what forces are imposed on these porous concrete or masonry structures to cause them to slowly erode, crumble and even fall apart. In today's atmosphere, fuel combustion particles contain sulfur dioxide ($SO_2$), which, when mixed with rain water ($H_2O$), produces sulfuric acid a prime pollutant. Lime salts inherent in masonry easily absorb the pollution compounds, and a breakup of molecular bonds in the structure occurs, resulting in slow erosion, cracks and eventual collapse of the structure.

Waterproofing materials and paints, when applied to structures by standard brush, spray or roll-on methods, tend to provide shallow penetration by capillary action, a single coat is insufficient, and a second coat tends to fill the breathing passages, as was reported to the National Bureau of Standards in Tech. Report No. 1118. Moisture, always being present in stone, has no resistance against frost or freeze-thaw cracks provided by such a thin veneer coat for protection. As a result, internal thermal stresses develop, and because vapor cannot escape, cracks and delimitations occur, which is why buildings and roads can crack-up and bridges can fall down.

Numerous other methods are used in attempts to preserve porous concrete or masonry structures. One method is to break open the structure, clean the rusted reinforcing steel and repaint it or replace the steel where necessary, and then repair the masonry or concrete structure. Another method is to drill holes in the structure in areas of the reinforcing steel members, apply a preservative material with a gun under manual or pump pressure, and then refill and repair the masonry. Another method used on roadbeds involves cutting elongated slots or grooves, filling such slots or grooves under gravity with a liquid preservative material, which may or may not eventually reach the reinforcing or structural steel, and afterwards fill the slots or grooves with a roadbed coating material. Electrical anodic treatment is sometimes used, also requiring breaking open and repairing the concrete. Such preservation methods are slow and costly processes, which are also inconvenient to travelers as the structure or road is out of use during such repairs.

Present Steel Preservation: The same acid rain that attacks porous masonry structures combines with masonry salts in catalytically attacking the steel that is used in strengthening such man-made masonry structures. The process involved in the destruction of embedded reinforcing steel embraces and combines four basic engineering sciences: chemical, electrical, metallurgical and mechanical. In the chemical process, the acid rain forms sulfuric acid, $H_2SO_4$, which acts as an electrolyte. In the electrical reaction, the electrolyte combined with the lime and mortar salts produces a galvanic response, which, aided by the sun's heat and radiation, causes the steel to release hydrogen ions, resulting in chemical break-up of the steel due to electrolysis. The metallurgical galvanic action of the sulfuric acid, with water and oxygen present, forms layers of ferric oxide (rust), causing severe volume expansion. The mechanical response thereto develops severe internal pressures, causing stresses to be imposed on the adjacent masonry structure, forcing it to break open as the steel loses its tensile strength. The problem often begins with a steel primer and paint coats that harden and resist expansion and contraction resulting from the high coefficient of expansion of steel. The coating therefore breaks open, allowing the atmospheric pollutants, moisture and oxygen to do the rest. This problem of short term inadequate protection occurs for both exposed and embedded structural steel.

Some presently used methods and apparatus for preservation of porous masonry walls include U.S. Pat. No. 4,204,495 to Wyner, which discloses the design of a high-speed pulsating air machine, and U.S. Pat. No. 4,395,457 also to Wyner, which deals with achieving a thermal insulating effect by entrapment of the air cells between masonry particles, thereby creating a multibarrier thermal insulating effect that prevents heat or cold from escaping through a walled masonry structure, so as to reduce high energy consumption and fuel costs. Also, U.S. Pat. No. 4,153,743 to Caramanian and U.S. Pat. No. 4,342,796 to Brown disclose surface treatment of concrete with sealant materials, but without injecting the sealant into the porous structure.

Present Wood Preservation: Currently, the application of paint, shellac, epoxies or urethanes to wood surfaces, results in protection which lasts but a few seasons to a year or more before the need occurs for scraping and sanding the old protective surface and repeating the coating application. This is due to the shallow penetrating effect of the applications made by brush, roll-on or spray.

The cellular resin structure of wood surfaces tends to cause a chemical migration in the wood when thermal expansion stresses are imposed—such as hot and cold weather spells. In the summer, the expansion stresses cause these coatings to expand by forces imposed by the wood's cellular resins. In the winter, the contraction stresses cause these coatings to crack and peel, allowing moisture, pollution and acid-rain intrusion to cause "lift-off" when freeze-thaw cycles develop. Thereafter, moisture absorption into the wood fibers accelerates decay.

SUMMARY OF INVENTION

The present invention provides a method for the long-range (30 to 40 years or more) preservation of porous structures such as concrete, masonry, stone, and wood, including those structures above and below ground having steel reinforcing members embedded therein, without the need for breaking open, destroying or repairing any part of their vertical or horizontal surfaces. The method comprises applying one or more liquid preservative materials such as a polymeric resin within the porous structure and utilizing one or more blasts of high velocity air to force the liquid preservative material into the porous structure to selected depths, accomplished by adjustment of the viscosity of the liquid material and the velocity and time duration of the air stream(s). The invention also provides apparatus suitable for practicing the method of applying the liquid preservative material into the porous structure(s) which may contain reinforcing steel members, such as reinforced concrete or masonry structures or infrastructure.

This invention embraces two technologies, that of the preservation of the porous material itself, as well as the preservation of reinforcing or structural steel members which may be exposed or embedded therein. Since most of the modern porous masonry structures contain embedded steel members such as rods, I-beams or angles, etc., designed to strengthen the structure, it is only with an understanding of the forces that weaken these structures that one can develop an effective cure against the costly and "cancerous" attack on man-made masonry-steel structures.

In this method, according to the invention which provides a new state-of-the art, the stream of high velocity air is applied substantially concurrently with the application of the liquid preservative material so as to inject and drive the liquid preservative material into the structure deep below the surface and into interstices of the porous structure and to form a thin film between the air cells of the structure. This honeycomb-like film encapsulating the stone particles permits any moisture trapped within the porous structure to permeate out with temperature increase, without generating localized pressures which could cause undesired cracks and delaminations. The injection force needed for the liquid preservative material depends on the density and porosity of the porous structure, and is selected so as to inject the preservative into the porous structure and to reach and protect the reinforcing structural steel, if any, which is deeply embedded in the structure. Thereafter, by reducing the air velocity force, the liquid preservative material can form its encapsulating film back up toward the surface to protect the porous structure without breaking open the surrounding masonry or concrete structure directly exposed to the weathering elements. The viscosity of the liquid preservative material is selected to accomodate the porosity of the structure and the ambient temperature. The blast of compressed air may be delivered at a high velocity of 100–1400 ft/sec in either a steady or in a pulsating fashion, depending upon the porosity and configuration of the structure being treated.

DESCRIPTION OF INVENTION

Figure 1:
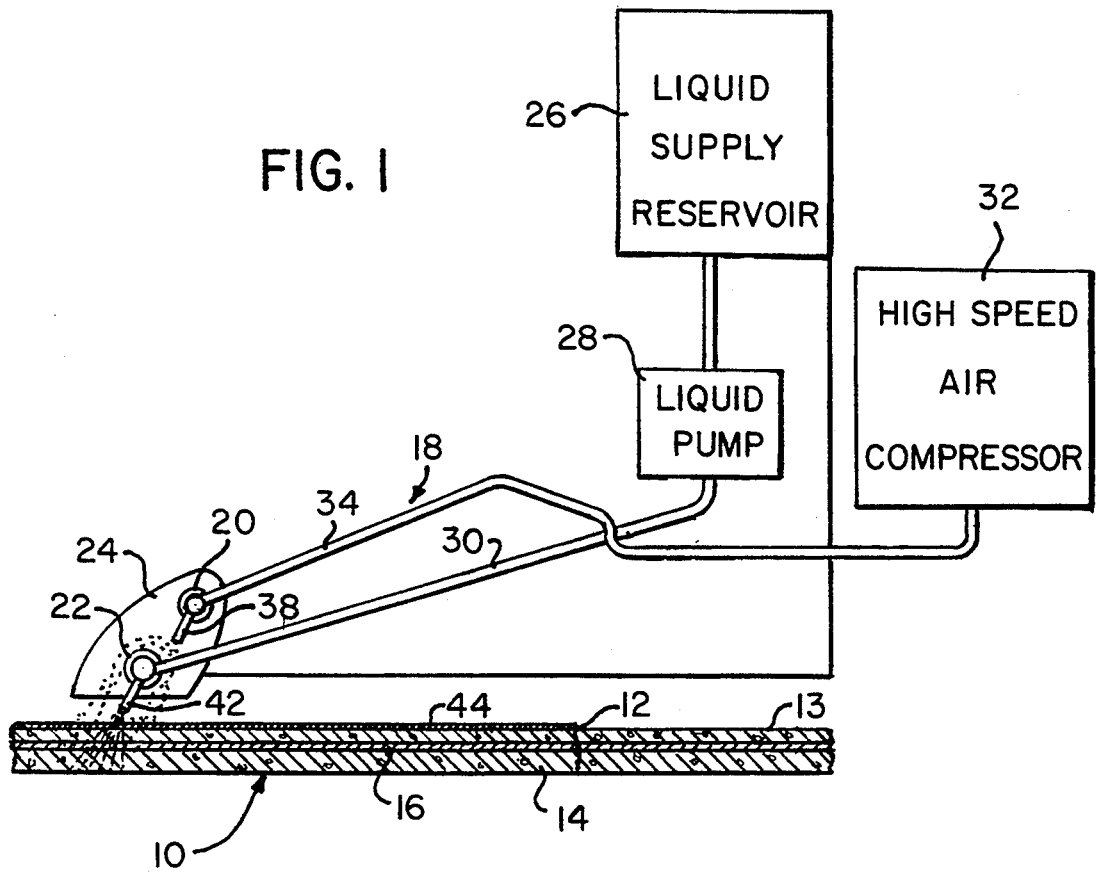
FIG. 1 is a diagrammatic view showing the essential parts of and apparatus for of the invention as arranged for treating a reinforced road bed structure shown in cross-section.

The invention discloses fundamental new criteria, discovered but not disclosed in my previous two patents, as described below.

New Masonry Long Range Preservation Technology

1. High Velocity Air for Deeper Penetration of Liquid and Greater Breathability of Treated Structures Present application techniques of brush, roll-on and spray coating methods can only produce shallow, thin-veneer coatings, and produce either short-range protection or irreversible damage-causing decay. It has been found that a pulsating direct "nail and hammer" method of liquid-air high velocity impregnation is required for porous structures having random stone configuration construction, while straight air velocity forces are useful against uniform stone configuration construction, in order to achieve deep impregnation of the liquid preservative material. In this manner, the pulsating liquid-air velocity forces are driven around random, uneven size stone particles, while straight air velocity forces penetrate to achieve deep protection in uniform stone construction. This method is in contrast with spraying a liquid onto a blank wall causing an immediate run-off, and displacing the outer air cells with a liquid, thereby blocking up the breathing passages by piling up at the surface. The object of the present invention is to have the liquid-air combination forces impinge on the porous stone; atomize and disperse the liquid by the pulsating or straight air velocity force, thereby driving the liquid deeply below the surface and forcing the liquid to encapsulate and/or be absorbed by the stone particles, while at the same time the outer all supply pushes and displaces the inner air cells by infiltration without allowing the liquid to be stagnant or to fill up the interstitial passages and displace the air cells between the stone particles. This is necessary in order to prevent blockage of the breathing passages while obtaining deeper penetration of the liquid preservative material. Moisture, which is always prevalent in stone, tends to change to a gas when the surface is heated by the sun, and the vapor pressure therefrom can create serious internal thermal stresses that can readily cause cracks and delamination when breathing passages have been blocked.

2. Protection Against Moisture, Pollutants and Acid Rain

The use of an acrylic polymeric resin, a silane, polymer, a polyurethane or other water proofing materials is acceptable, as the liquid preservative some providing better characteristics than others under severe and varying conditions. However, using the high velocity air-liquid injection method does a superior job of deep penetration, as it does not rely on gravity feed or atmospheric pressure of capillary attraction alone. A waterproofing effect is achieved when a stone particle absorbs or is encapsulated by a clear, "glass-like" substance, which is insoluble in water and resistant to chemical attack. A suitable material is the "P-J" 200 Series of preservatives, an acrylic polymeric resin. Other materials having similar characteristics can also be used. When the porous stone particles are covered by the clear glass-like preservative, the absorption capability of the structure is eliminated as water and acid rain are repelled and cannot of the structure. This insulates against sulfuric and nitric acid erosion forces, as it acts as a sealer and water proofer.

3. Protection Against Internal Shear Stresses that Cause Cracks and Delamination Vapor pressure due to internal moisture inherently present in masonry must be allowed to escape. For example, when bricks are painted, after six months to a year the paint cracks due to the vapor pressures lifting off the paint from the substrate. When tar covers parapet walls, it not only cracks but permits continued vapor action which causes brick, mortar and concrete to pulverize. But the high-speed liquid-air injection of the liquid preservative material into a porous masonry structure by way of deep impregnation, creates a thin honeycomb membrane around the air cells with multi-layered air entrapment barriers to relieve internal pressures due to thermal stresses that most often develops between the treated and untreated stone.

4. Protection Against Salts and Chloride Ions Going Into Solution and Crystallizing in the Stone Lime salts (cement contains over 62% lime salts) or chloride ions deep in the stone, by use of this deep waterproofing method, will be unable to go to solution, as moisture in liquid form is prevented from making contact with the salts by the preservatives encapsulating film, yet this invention permits permeability of gases in the already-treated areas since the breathing passages remain unblocked.

5. Protection Against Penetration of External Winter De-Icing Salt Deposits

Such salt penetration has caused untold millions of dollars in damage costs to steel reinforced concrete on roadways and parking decks. The deep penetration produced by the present liquid-air injection process can effectively seal the structure and insulate both the porous stone and imbedded steel against this common attack.

6. Insulation Against External Frost

Frost cycles which normally create cracks will have little or no effect on structures treated by this invention, because the entrapment of a multi-layered air barrier acts as a good insulator.

7. Insulation Against External Freeze-Thaw Cycles

Freeze-thaw cycles have the same negligible effect as external frost action, on structures provided with the deep insulating air entrapment by the preservatives encapsulating coating. Thin-veneer, barely penetrating coatings of the prior art offer no resistance against these freeze forces nor can the thaw vapor pressures pass through blocked air passages in the stone. That is why the known standard coatings applied by conventional methods have at best offered only short-term protection.

8. Protection Against Hairline Cracks, Develop Strength by Consolidation of Molecular Bond Acrylic polymeric resins as well as some silanes have been known to consolidate and strengthen cracks in brick, mortar and concrete. The acrylic resin, acting much like a glue, has been shown to strengthen the molecular bond of the masonry and has reduced the need for repairs or replacement of brick. Also, by use of the liquid-air injection process, art statuary, however decomposed, can be held from further destruction by acid rain and the weather elements.

9. Protection Against Graffiti Attack

After a structure has been treated and has absorbed the acrylic resin preservative material the resulting film of which is impervious to chemical attack, it cannot absorb other liquids such as spray paints. Silanes alone are ineffective against graffiti; acrylics, however, provide a penetrating encapsulating film uniform throughout the depth of the structure by using varying pressures and viscosities, and offer breathable protection against pressures from within the stone, while protecting the external surfaces from graffiti attack by use of clear and invisible acrylics applied by liquid-air injection.

10. Protection Against Preservative or Paint Cracking or Peeling on Wood, Stucco or Other Structures The process of straight liquid-air injection or high-speed pulsating application is not limited only to porous masonry and/or embedded structural steel reinforced concrete structures. The liquid material injection application can be used to preserve wooden structures as well, and can be used to obtain deeper penetration of stains or paints, to prevent weather elements from eroding or "sandblasting" the surface finish. The liquid-air injection system applied in field conditions can be compared favorably to chemical pressure treatment of wood in a factory. By air injecting a prime coat material, the present process can insure paint longevity.

11. Insulation Against Energy Losses (Heat and Air Conditioning)

An independent test conducted on a 50-year-old masonry building wall found the entrapment of air cells in masonry, by way of the injection process, as described in U.S. Pat. No. 4,395,457, reduced by 60% the heat losses and also air conditioning losses through its building wall.

New Steel Preservation Technology

In order to develop a preservative material and method useful against rust and decay of steel, certain characteristics that deviate from the conventional coating were found to protect steel surfaces far more effectively. A new liquid preservative material having these characteristics and known as RS-22, is a blend of petroleum hydrocarbons in a combination of aromatic and/or aqueous solutions. After injection, evaporation of the solvent vehicle produces a continuous, well-adhering flexible coating. The steel is protected by a two-coat application for exposed structural steel and one coat injected on embedded reinforced steel. The film is composed of hundreds of thousands of oil-like globules, held together by intermolecular attraction. The coating, due to its makeup, will remain soft and pliable over long periods of exposure, and is unaffected by the photochemical destructive rays of the sun, since the hydrocarbon film is ultra-violet light resistant. The RS-22 material coating is manufactured by Perma-Jection Corp. U.S.A., Richmond Hill, N.Y., and provides a continuous water-repellent surface, as water, moisture condensation and oxygen cannot penetrate to the substrate of the steel surface.

1. Protection Against Chemical and Electrolysis Attack

The RS-22 steel preservative material and method of application were developed to combat the corrosion forces of acid rain and the presence of lime salts by use of hydrocarbons resistant to chemical attack. Also, the intermolecular attraction of the coating, coupled with a mechanical bond to the steel substrate, tends to provide the continuous film required to prevent an electrical contact from being developed.

2. Insulation Against the Sun's Heat and Thermal Expansion

Use of the RS-22 protective coating on masonry and steel reduces conductive heat directly or from radiation. The insulating effect from the air entrapment film on the masonry substantially reduces the transmission of increased temperatures due to the sun's heat and radiation. Also, the liquid-air injection entrapment method, while providing the insulation for the masonry against heat, similarly insulates the steel from a high rate of thermal expansion and contraction, produced by the sun's warming.

3. Protection Against Temperature and Load Fluctuations Which Cause Crystallization and Brittleness Research at Lehigh University established a relationship between rate of corrosion, fatigue crack growth and rate of electrochemical reactions in high strength steels. The effects of temperature and load fluctuations are directly related to durability and reliability of steels. Insulating against temperature fluctuation by the RS-22 coating on the steel and the air entrapment method in the porous stone can reduce crystallization and brittleness.

4. Protection Against Moisture and Oxygen Attacking Steel Surface

The well-adhering flexible coating provided by the application of RS-22 permits the movement of the steel, expanding and contracting when necessary without cracking or breaking the protective coating. This prevents the moisture and oxygen from entering and for developing the galvanic response discussed earlier. The insulated and waterproofed concrete prevents moisture, acid rain or road salts from intruding into the surface and from attacking the steel embedded therein.

5. Protection to Salts in Solution

The liquid RS-22 protective coating, being impervious against salts and chemical attack on the steel coated therewith, with the added insulation and dryness of the masonry surrounding the embedded steel due to the use of the P-J 200 Series masonry waterproofing material, will provide improved insulation against salts, both from within and without.

6. Protection Against Steel Rust Expansion and Masonry Cracks

Considering the above insulation factors achieved by the method of this invention, the lack of the electrolyte and galvanic response insures against hydrogen ion release, and therefore prevents the development of rust and the eventual loss of steel tensile strength. The prevention of ferric oxide formation and the elimination of the expansion of rusted layers on steel, avoid the stresses that have plagued man-made steel reinforced masonry structures.

Combining the Stone and Steel Technologies

This invention advantageously provides a low-cost method of treating and preserving porous masonry structures including embedded steel in reinforced concrete structures as well as the structural steel, while insuring that the masonry surface or face is preserved, strengthened and insulated against the elements. In combining the two technologies for preserving porous stone and reinforced steel structures, a single preservation material with one high velocity air injection may be used for both surfaces. In this case, the single preservative material is injected with a higher air velocity depending on the depth of the embedded steel in the stone, followed by the same injection having a lesser air velocity to protect the masonry in front of the steel, and while still using the same air injection with the liquid preservative, reduce the air velocity force still further in order to achieve air cell entrapment in the masonry at the same time the preservative weatherproofs and strengthens the masonry structure. The air velocity force may be applied in the form of straight air blasts or pulses depending on the penetrability of the masonry material being treated.

When using more than one liquid preservative material, i.e. one for porous stone or masonry and another type for steel, the steel preservative material would be injected first at the higher air speed, followed by a second but separate injection using the masonry preservative material at varying speeds as described above, in order to achieve the insulated effect as described herein. An intermediate cleansing action may be required between coats.

In structures where embedded reinforced or structural steel is not encountered, the masonry preservative would be used with a single air injection application, applying the liquid material with varying air velocities in order to achieve the dead air entrapment desired. Varying air velocities will tend to produce a multi-layered barrier in the stone for dead air entrapment insulation purposes. However, the apparatus operator would be able to obtain a uniform preservation material barrier by simply raising or moving the injection nozzles away from the surface being treated by one to two inches or more, which will adjust the depth of liquid penetration.

New Wood Preservation Technology

Injection of the polymeric resin into unpainted or unstained wood deeply into the pores, permits permeability of the vapors developed by the wood's cellular resins. Based on the wood structure, an entrapment of the air cells between the wood fibers enhances a thermal and mechanical insulating effect. The thermal effect insulates the wood against freeze-thaw cycle stresses, thereby reducing cracks and peeling of the outer coat surface. The mechanical insulation inhibits or prevents the migration of the wood resins during temperature changes, yet permits breathability to inhibit cracks and separations due to build-up of vapor pressure.

After the wood is injected with either a clear polymeric resin or an opaque stain, the long-range preservation capability is built-in for either a paint type application or left in a protective stained form. The chief factor that causes short-term, or seasonal failures is eliminated by insulating the untreated wood first, thereby preventing the stress factors from causing damage and eventual decay of the wood structure.

An apparatus suitable for practicing the method of this invention by injecting liquid preservation material into porous structures includes a pair of manifolds, one for the liquid preservation material and the other manifold for the blasting air. The manifolds each have outlets for their respective fluids, and are positioned with respect to each other so that the air blast is applied to the surface of the porous structure substantially concurrently with the application of the liquid preservation material to such surface. The manifolds each comprise longitudinally extending members and their outlets extend laterally of each other along their respective members. The manifolds may be mounted on a carrier, which includes means for furnishing compressed air and liquid preservation material to the manifolds. Means are also provided for delivering the liquid preservation material to the surface of the structure in the form of a liquid air stream, or straight liquid under gravity feed or pressure, depending on the porous substrate. The method and apparatus are suitable for applying liquid preservation materials to the vertical or horizontal surfaces of the structure.

DETAILED DESCRIPTION OF INVENTION

Figure 1A:
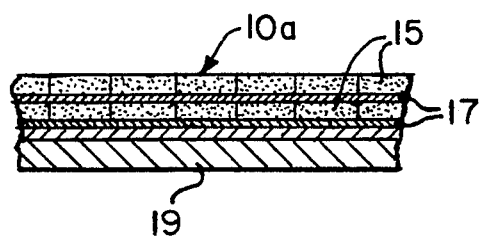
FIG. 1A shows a cross-section of another porous reinforced structure, a building wall.

As generally shown in FIG. 1, a masonry structure 10, herein a road bed, comprises an asphalt layer 12 provided on top of a concrete base 14, or just solid concrete 13, all reinforced with elongated steel rods 16. FIG. 1A shows a masonry structure 10a, such as a portion of a building wall comprising two courses of brick 15, joined by mortar 17, and strengthened by a structural member 19 such as steel I-beam, angle, etc. Apparatus 18 comprises an air manifold 20 and a liquid manifold 22, which are covered on all but one side by a shroud 24. Liquid preservation material is delivered to a liquid manifold 22 from liquid supply reservoir 26, via pump 28 and tubing 30. Compressed air under high velocity is delivered to the air manifold 20 from the air compressor 32, via tubing 34.

Figure 2:
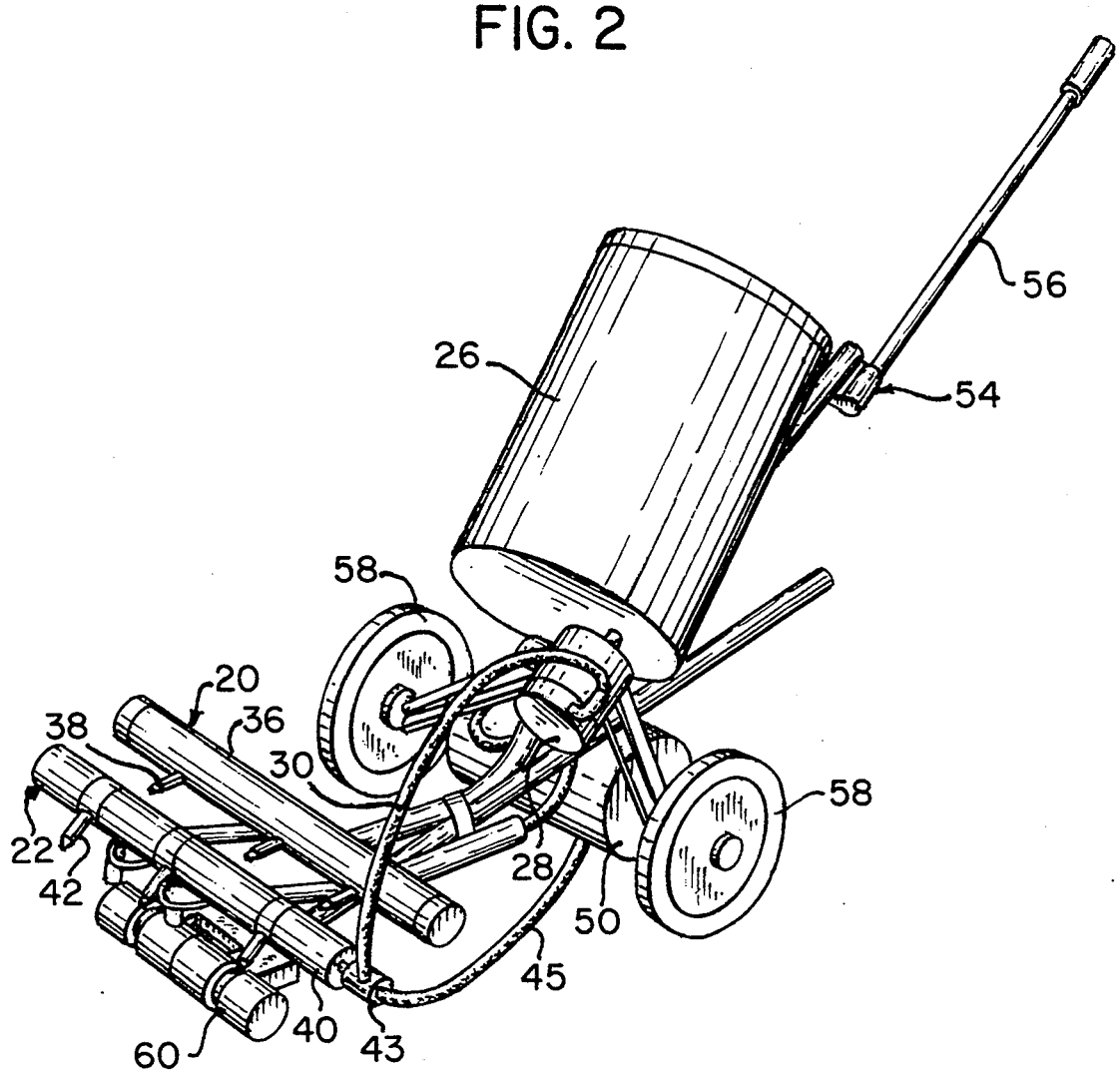
FIG. 2 is a perspective view showing the apparatus according to the invention.

As shown in FIG. 2, air manifold 20 is formed by an elongated pipe 36 having a plurality of outlet nozzles 38 spaced laterally from each other along the length of the pipe 36. Similarly, liquid manifold 22 is an elongated pipe 40 having a plurality of outlet nozzles 42 spaced laterally from each other along the length of pipe 40. The ends of pipe 36 and 40 are closed except for a liquid air inlet device 43, mounted on the inlet end of pipe 40.

As best shown in FIG. 1, the manifolds 20 and 22 and their respective outlet nozzles are arranged with respect to each other to enable compressed air from outlet nozzles 38 to impinge at high velocity on the liquid preservation material from outlet nozzles 42 in the same area of the surface 44 of structure 10 on which the liquid preservation material is impinging, and at substantially the same time. The high velocity air from nozzle 38 flows around pipe 40 to reach the surface 44.

Figure 4:
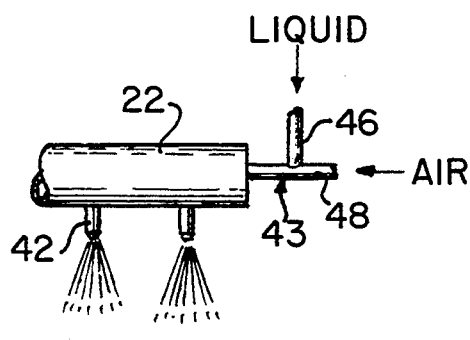
FIG. 4 shows a partial view of a liquid application manifold of the apparatus for practicing the method of the invention.

Preferably, the liquid preservation material is delivered to liquid manifold 22 in the form of a liquid-air stream. For this purpose, and as best seen in FIG. 4, liquid-air inlet device 43 comprises a T-shaped member having a liquid inlet branch 46 and an air inlet branch 48. Air from air compressor 50 (FIG. 2), passes via tube 45 through branch 48, meeting incoming liquid preservation material from branch 46, resulting in a liquid-air stream flowing into pipe 40 of liquid manifold 22 and out from there via outlet nozzles 42. The liquid preservative could also be applied in an airless liquid flow, thus eliminating tube 45, the air inlet 48 and the small air compressor 50, depending on the pressure required for penetration allowing for density and porosity of the masonry structure 10.

As best seen in FIG. 2, the aforesaid-described parts of apparatus 18 are preferably mounted on a carrier 54, which includes handle 56 and dual wheels 59. In this manner, the apparatus 18 can be moved along the length of the structure 10 to apply liquid preservation material to the structure along its entire length. Manifold pipes 36 and 40 can be varied in length to accommodate the various widths of the structures which are to be impregnated with the liquid preservation material. Adjusting rollers 60 are also provided to vary the distance of the ends of liquid nozzles 42 from the surface 44 of the masonry structure which is undergoing treatment with preservation material. Compressor 32 may be mounted on carrier 54, but preferably because of its size is mounted on a separate carrier (not shown).

Figure 3:
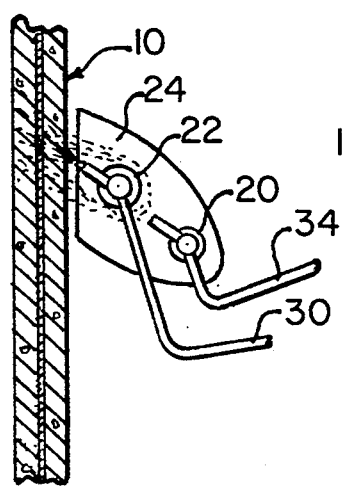
FIG. 3 is an elevation view showing a portion of the apparatus for practicing the method of the invention in use for treating a vertical wall in cross-section.
Figure 3A:
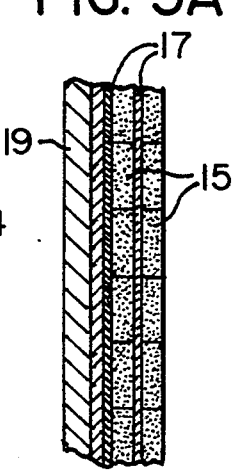
FIG. 3A shows a cross-section of a vertical wall of another type of porous structure.

The method and apparatus of the invention is applicable to the preservation treatment of vertical surfaces of structures as well as horizontal surfaces, as illustrated in FIG. 3 and FIG. 3A. The two manifolds can be suitably arranged for portability and manual handling, rather than being mounted on a wheeled carrier 54 as illustrated in FIG. 2.

Liquid preservation material suitable for preserving reinforced masonry structures, such as P-J 200 Series acrylic resins and RS-22 petroleum blend are available from Perma-Jection Corp. U.S.A., 134-20 Jamaica Ave., Richmond Hill, N.Y., 11418.

In the operation of apparatus 18, the manifolds 20 and 22 are moved longitudinally along the surface 44 of the structure 10, while a continuous supply of liquid preservation material and compressed air are delivered from nozzles 38 and 42 to the surface of the structure. The high velocity compressed air injects the liquid material Into the body of the structure 10, coating the surfaces of the interstices of the masonry granules, as well as coating the surfaces of the structural steel or reinforcing bars of the structure. The compressed air, in effect, acts as a fluid hammer, driving the liquid preservative material into the interior of the structure, in a blasting action. The blast of the compressed air can be delivered in a pulsating fashion using the mechanism disclosed in my U.S. Pat. No. 4,204,495, or by a similar mechanism.

For porous structures having relatively uniform construction and porosity such as brick, concrete, limestone, sandstone and such, straight air blast application of the liquid preservative material is suitable, using an air velocity of 10--166 ft/sec for 4-7 seconds duration, depending on the density and porosity of the structure. Higher pressures may be necessary for denser material, where deep penetration is desired. However, for random masonry or stone structures, having random configuration, it is necessary to inject a preservative liquid-air mixture by utilizing pulsating air velocity forces (nail and hammer form) using air velocities of 200-235 ft/sec applied for 3-6 seconds duration to reach steel reinforcing bars embedded 2.5-3.5 inches deep in reinforced concrete such as a road deck. Higher pressures and longer duration may be required for higher density concrete. For a first application step at ambient temperatures of 45°-75° F., the viscosity of the liquid preservative material used should be low, e.g. Ford No. 4 cup of about 20 sec. The shroud 24 should be maintained about 0.5-0.75 inches above the surface 44 of the structure being treated. For a second application, a slightly more viscous liquid (Ford No. 4 cup =32 sec.) and reduced air velocity of 165-200 ft/sec for only 3-5 seconds may be used, the material being applied somewhat closer to the masonry surface. If desired, a third preservative application may be provided, by using a higher viscosity liquid (Ford No. 4 cup—45 seconds), and lower air velocity of 100-135 ft/sec for 2-4 seconds duration.

The third application would still be below the surface which is important in the case of road surfaces to avoid skidding or direct contact with vehicle tires.

If the ambient temperature falls to 32°–40° F., it would be necessary to reduce the liquid viscosity and increase the air velocity forces and time of application accordingly by about 10% from those values mentioned above. However, for higher ambient temperatures in the range of 80°–90° F., the opposite changes would be required, i.e. increasing the liquid viscosity and reducing the air velocity and application time by about 10% from those mentioned above. For new structure surfaces, the liquid viscosities and air velocities should be reduced by about 5% from the above values.

In addition to the use of a single preservative material with a single injection method for the preservation of steel and stone structures as indicated above, it is within the scope of this invention to use two different and separate liquid preservative materials, one for steel reinforcing members, and the other for granular masonry materials. This would be accomplished by using the apparatus described above but modified to provide another liquid reservoir and control means located between the reservoirs for delivery of each liquid preservation material to two separate liquid manifolds 22 in selective fashion. Such operation would use two separate blasts of air, from either one or two air blast manifolds 20, one blast against the first liquid manifold to inject the liquid deeply into the structure to coat its structural steel or reinforcing members, and a second blast of lesser velocity to inject the other liquid into the stone masonry, less deeply into the structure, so as to coat the surfaces of the interstices of the granular masonry material of the structure. An intermediate blast of air may be used to cleanse the surfaces of the interstices of the granular material of any liquid preservation material for the steel which was injected first into the structure and which might be present. Alternatively, a cleansing material may be incorporated into the masonry preservation material, thereby eliminating the need for a separate intermediate blast of cleansing air.

For application of the invention to wood structure, the air velocity forces can be reduced by 25–45% and the liquid velocity can be reduced by 20% until no runoff of liquid occurs during an exposure time of 2–3 seconds. Following such deep penetration treatment of wood, the treated surface can be conventionally coated with paint or varnish, to achieve a desired color or decorative effect.

The above ranges are intended for illustrative purposes. But obviously the type of material being worked upon governs the operating parameters.

Performance Tests Conducted

To provide substantiating evidence of the insulating effects on the preservation of masonry structures, provided by the method herein disclosed certain laboratory and field tests were conducted which demonstrate conclusively that the enumerated insulation factors can be achieved by the high-speed air injection method and apparatus for practicing it.

In an independent field test conducted by New York University, it was discovered that a 50-year-old building wall, when injected utilizing this invention, reduced by 60% the heat and air conditioning losses through the wall. The Picasso statue at New York University, a 3½-story-tall reinforced concrete art structure, has been weatherproofed and preserved against the weather elements for a period now entering its twelfth year. The Niagara Falls Convention Center Plaza, a football-field-sized reinforced concrete facility, was treated with our masonry insulation preservative method. During and after a 15-year period, the has acted as a water and weatherproofer as well as an anti-graffiti coating. Fissures and hairline cracks were arrested and stopped from developing further. Equally important, the invention protected against the acid environment created by sulfuric acid manufactured by chemical factories in the Niagara Falls, N.Y. area, and provided insulation against chemical attack, frost, freeze-thaw cycles due to temperature extremes, as well as the efflorescence and crystallization of salts due to the inherent salts in the concrete.

On a road field test conducted on the slow lane deck of the Verrazano Bridge in New York, the injection of preservative liquid into the concrete reduced potholes by 80% during a seven-month winter period, which involved extreme weather temperatures and road salts, in a sea water environment.

In a most important significant field test as supervised by the National Bureau of Standards using the high-velocity air injection process to determine the depth of penetration of the liquid preservative material in stone, cores taken from the U.S. Capitol wall were tested by the Bureau, indicating a penetration by the liquid preservative of about 4.50 inches or 115 mm. This test proved that the penetration was more than sufficient to obtain dead air entrapment in masonry structures, which acts as a good thermal insulator for energy saving purposes. On monuments or landmark art sculpture such as the lions at the New York Public Library, irreversible damage of cracks and delamination can occur, as the result of a non-breathable coating having been previously applied. However, the landmark eagles flanking Madison Square Garden in New York were protected with the "P-J" process and show a successful and natural stone look due to the breathability of the treated sculptures, providing long-range protection without any surface separations, going on its fifteenth year.

While this new invention for preservation of masonry and other structures having embedded reinforcing steel eliminates the need for masonry repairs where applicable or the cost of breaking into the structure, the use of liquid RS-22 preservative material has proved itself in the laboratory as well as in field usage. The National Testing Laboratories of New York tested RS-22 preservative against acid attack, moisture, weathering and adherence to steel as well as to paints and fireproofing materials. Besides successful lab tests, the RS-22 preservation proved its long-range capability in both exposed and embedded reinforcing structural steel. In exposed structural steel preservation, with sea water and acid-like environment under an air conditioning tower, the RS-22 preservative material proved itself in withstanding severe exposure without developing rust, or cracking or peeling of the flexible coating for nineteen years. The embedded steel was exposed to dampness, salts and pollution, coupled with load vibrations in the five buttresses that strengthened a large wall of St. Thomas church in New York City.

This type of steel exposure, protected with the RS-22 preservative material demonstrates conclusively that the steel insulating factors of the treatment listed hereinabove have now been proven to provide long-term protection.

Although this invention has been described broadly and also in terms of specific embodiments, it is understood that modifications and variations can be made all within the scope as defined by the following claims.

What I claim is:

1. The method of preserving porous structures above or below ground, said porous structures including masonry, concrete, brick, stone, marble and wood, as well as those with steel reinforcement members embedded within, without damaging the surfaces of the structures, to prolong the structures' life by an approximate tenfold increase over present methods against attack by acid rain, erosion, aging or decay, comprising the steps of:
   a) applying a liquid preservative material under pressure to an outer exposed surface of a porous structure at least once; and
   b) substantially simultaneously with each said at least one liquid application, directing a pulsating blast of compressed air onto said liquid material acting as a fluid hammer for random masonry construction, directing a continuous air blast for uniform masonry construction, at sufficient velocity and force, with both liquid and air pressure acting together, to penetrate the surface of said porous structure and to inject said liquid preservative in dispersed form deeply into said porous structure so as to coat and waterproof the walls of the interstitial passages existing between masonry particles in said porous structures with said dispersed fluid material and to prevent said dispersed liquid preservative from stagnating in and blocking said interstitial passages, the incoming rush of air atomizing and forcing said dispersed liquid preservative through said interstitial passages, thus, after treatment, maintaining the breathability of said porous structure by enabling the passage of water vapor and permitting further and continued migration of said liquid preservative for a time to provide even deeper protection against cracks and delamination of said porous structure from internal stresses and environmental and weathering exposure.

2. The method of claim 1, wherein said porous structure without reinforcing steel members embedded therein is selected from the group consisting of a granular masonry material and cellular material such as wood.

3. The method of claim 1, wherein the form of said liquid preservative material applied to said surface under pressure is selected from the group consisting of a liquid stream and a liquid-air mixture stream.

4. The method of claim 1, wherein said liquid preservative material is selected from the group consisting of acrylic resins, polyurethanes, epoxy resins, silane polymers and petroleum hydrocarbons.

5. The method of claim 1, wherein said liquid preservative is a polymeric resin material.

6. The method of claim 1, wherein the air flow velocity applied to the liquid material is 100–1400 ft/sec.

7. The method of claim 1, wherein said porous structure further comprises steel reinforcing members embedded therein, said liquid preservative material being provided in the form selected from the group consisting of a straight liquid stream and a liquid-air mixture stream, whereby said steel reinforcing members and the intersticies of said porous structure are coated with said liquid preservative material.

8. The method of claim 7, wherein said liquid preservative material is applied for the preservation of both said steel reinforcing members and said porous structure.

9. The method for preserving a porous masonry structure having steel reinforcing members embedded therein, comprising the steps of:
   a) applying a liquid preservative material for said reinforcing members to the surface of said porous structure;
   b) substantially simultaneously with step a, applying a blast of compressed air onto said surface and said liquid preservative applied thereon at sufficient velocity and force to inject said steel preservative material into said structure and to coat said steel members with said steel preservative material;
   c) applying a different liquid preservation material for said porous granular masonry structure on the surface thereof; and
   d) substantially simultaneously with step c, applying a blast of compressed air to said porous masonry surface and said liquid masonry preservative material applied thereon of sufficient velocity and force to inject said liquid masonry preservative material into said structure so as to coat the inner interstitial surfaces of said granular structure with said liquid masonry preservative material, thereby insulating said steel members against thermal expansion and contraction forces.

10. The method as claimed in claim 1, wherein an a protective effect is provided by the applied coating for preventing graffiti attack into said masonry by outside substances.

11. The method of claim 1, wherein said porous structure is wood and the injection step provides protection against short-term cracking and peeling of conventional coating materials on said wood.

12. The method of claim 9, wherein intermediate steps following step b comprise:
   b') applying cleansing liquid to said surface of said masonry structure; and
   b") substantially simultaneously with the application of said cleansing liquid, applying a blast of compressed air to said surface of said masonry structure with sufficient velocity and force to remove any portions of said steel preservative material which might remain clinging to said surfaces of said interstitial passages in said granular masonry structure.

13. The method of claim 9, wherein said masonry granular preservation material contains sufficient cleansing ingredients to remove remaining portions of said steel preservation material which might be clinging to the surfaces of said the interstices of the granular masonry structure.

14. The method of claim 9, wherein the blast of compressed air for injecting said liquid preservative material for steel is applied at greater velocity for coating the steel than the velocity of compressed air for coating said interstices of the masonry structures.

15. The method of claim 9, wherein the viscosity of the liquid preservative material for the steel reinforcing members is lower than the viscosity of said the liquid preservative material for the granular masonry material.

16. The method of claim 9, wherein an air cell entrapment barrier is formed by the applied coatings for protecting against ionic salt migration that would otherwise attack said steel reinforcing members and said porous masonry structure.

17. The method of claim 9, wherein an air entrapment barrier is formed by the applied coating insulating the structure against temperature and thermal stresses.

18. The method of claim 9, wherein a stronger molecular bond between the granules in said porous masonry is formed by the applied coating.

* * * * *

UNITED STATES PATENT AND TRADEMARK OFFICE
CERTIFICATE OF CORRECTION

PATENT NO. : 5,413,808

DATED : May 9, 1995

INVENTOR(S) : Jay S. Wyner

It is certified that error appears in the above-identified patent and that said Letters Patent is hereby corrected as shown below:

Column 4, line 48: "all" should read --air--

Column 5, line 11: after "cannot" insert --penetrate the surfaces--

Column 12, line 5: after "the" insert --treatment--

Signed and Sealed this

Twenty-fourth Day of October, 1995

Attest:

BRUCE LEHMAN

Attesting Officer

Commissioner of Patents and Trademarks